F. BAURICHTER.
RAILWAY TIE AND MEANS FOR FASTENING THE RAILS ON THE TIES.
APPLICATION FILED SEPT. 13, 1916.
Patented Mar. 27, 1917.
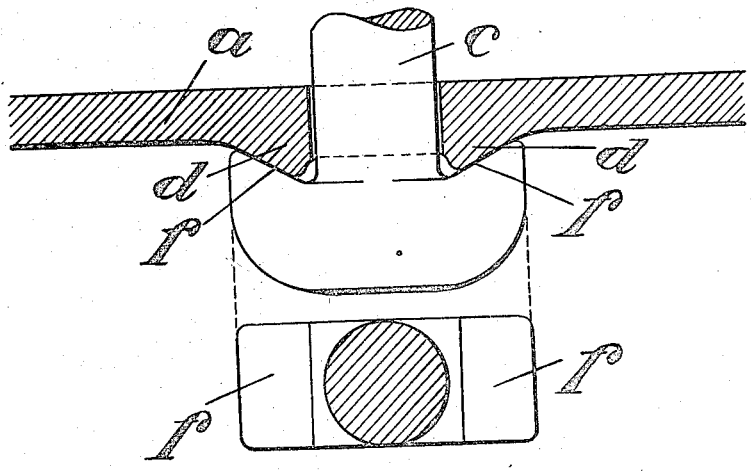

UNITED STATES PATENT OFFICE.

FRITZ BAURICHTER, OF OSNABRÜCK, GERMANY, ASSIGNOR TO THE FIRM OF GEORGS-MARIEN-BERGWERKS- & HÜTTEN-VEREIN A.-G., OF OSNABRÜCK, GERMANY.

RAILWAY-TIE AND MEANS FOR FASTENING THE RAILS ON THE TIES.

1,220,490.  Specification of Letters Patent.  Patented Mar. 27, 1917.

Application filed September 13, 1916. Serial No. 119,861.

*To all whom it may concern:*

Be it known that I, FRITZ BAURICHTER, a subject of the King of Prussia, German Empire, residing in Osnabrück, Germany, have invented a new and useful Improvement in Railway-Ties and Means for Fastening the Rails on the Ties, of which the following is a specification.

My invention has for its object to prevent touching and in consequence shearing strain, harmful pressure between the bolt of the tightening screws and the side-surfaces of the holes in the top-plate of the tie through which the ties are in danger of cracking and breaking.

I divide the usually even contact surface between the screw head and the lower surface of the top-plate of the tie into two even half surfaces, inclined toward the center of the bolt in such manner, that the bolt is held firmly against side-shifting in the direction of the rail and against turning of the bolt. The two half even surfaces are tapering toward each other in such manner, that the two sides of the top-plate of the tie are held together by the bolt-head.

Figure 1 is a transverse vertical section through the tie.

Fig. 2 is an enlarged section through the top-plate of the tie and through the hole and a side view of the head and bolt in the longitudinal direction of the tie.

Fig. 3 is a cross section through the bolt.

The tie *a* has a central aperture *b* and the lower surface of the top-plate of the tie has two triangular projections *d*, having inclined flat contact surfaces corresponding exactly to the two even half contact surfaces *f* on the head of bolt *c*. A fourcornered or elliptical short part as ordinarily used with bolts, to prevent turning, is not needed, and this is of great importance, because through turning of the fourcornered or elliptical bolt parts many breaks in steel are caused.

Fig. 2 shows clearly that the bolt is exactly and firmly held in the middle of the bolt hole.

What I claim and desire to secure by Letters Patent is:

1. A combination of a top-plate of a railway steel-tie, having at its lower surface on both sides of the bolt hole two triangular projections and inclined flat contact-surfaces, and a bolt, having on its head two even half contact surfaces corresponding in angle and width to the inclined contact surfaces of the projections, thereby holding the tightened bolt firmly in the center of the bolt hole and preventing its turning, preventing shearing strains in the bolt and breaking strains in the tie.

2. A combination of a top-plate of a railway steel-tie, having at its lower surface on both sides of the bolt hole two triangular projections and a bolt having inclined flat contact-surfaces, corresponding in angle and width to the inclined contact-surfaces of the projections and tapering toward each other in such manner that the two sides of the top-plate of the tie are held together by the bolt head.

In testimony whereof I have signed my name to this specification in the presence of two subscribing witnesses.

FRITZ BAURICHTER.

Witnesses:
 ALWIN VICTOR,
 EWALD DRIPLER.

Copies of this patent may be obtained for five cents each, by addressing the "Commissioner of Patents, Washington, D. C."